United States Patent Office 3,352,903
Patented Nov. 14, 1967

3,352,903
(α-ALKYLIDENEACYL) PHENYL-
ALKANOIC ACIDS
Everett M. Schultz, Ambler, and James M. Sprague,
Gwynedd Valley, Pa., assignors to Merck & Co.,
Inc., Rahway, N.J., a corporation of New Jersey
No Drawing. Filed Jan. 22, 1963, Ser. No. 253,042
7 Claims. (Cl. 260—515)

This invention is concerned with (α-alkylideneacyl) phenyl compounds in which said phenyl ring is further linked to an alkanoic acid moiety, as well as the salts, esters and amides thereof.

This invention more specifically is concerned with (α-alkylideneacyl)phenylalkanoic acids which can be illustrated by the structural formula

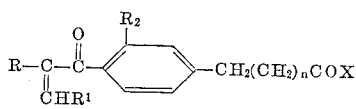

wherein:

R is selected from the group consisting of
  lower aliphatic,
    straight or branched chain,
    unsubstituted or substituted, the substituent group(s) being
      alkyl,
      halogen,
      halogen-like,
      carboxyl or derivative thereof,
      cyano,
      alkyl thio,
      aryl thio,
      arylsulfonyl,
      alkylsulfonyl,
      heterocyclic, as an azacycloaliphatic, e.g., morpholinyl, piperazinyl, pyrrolidinyl and the like;
  alicyclic,
    either unsubstituted or substituted, the substituent group(s) being the same as those described above for the aliphatic group;
  aryl, especially a phenyl radical;
$R^1$ is selected from the group consisting of hydrogen, and, when R is methyl, $R^1$ can be either hydrogen or lower alkyl, especially methyl;
$R^2$ is selected from the group consisting of
  hydrogen,
  halogen, especially chlorine and bromine,
  lower aliphatic, especially lower alkyl, advantageously methyl
  lower aliphaticoxy, especially lower alkoxy, advantageously methoxy;
X represents
  hydroxyl or salts of the resulting acids, i.e.,
    metal salts, especially sodium, potassium, calcium and the like or amine salts,
  alkoxyl,
    unsubstituted or substituted, the substituent(s) being dialiphatic amino and the like,
  amino,
    such as an amino group of the structure —$NR^7R^8$ wherein $R^7$ and $R^8$ are the same or different radical selected from
      hydrogen
      aliphatic, unsubstituted or substituted, group, especially lower alkyl
      aromatic, unsubstituted or substituted, group, especially substituted phenyl or
      either $R^7$ or $R^8$ can be lower alkoxy, and additionally $R^7$ and $R^8$ can be joined together to form, with the nitrogen atom to which they are attached, a hetero ring containing one or more hetero atoms as morpholinyl, piperazinyl, pyrrolidinyl and the like, and
  1,1-di-lower-alkyl-hydrazino;
$n$ is an integer selected from 1 and 2.

In the above definitions and in the claims, the term halogen embraces halogen-like groups and represents chlorine, bromine, iodine, and fluorine.

The compounds of this invention and particularly compounds having the structure illustrated above where R is lower alkyl, especially ethyl, $R^1$ is hydrogen, $R^2$ is hydrogen, chlorine or bromine and X is hydroxyl, as well as derivatives thereof or precursors thereof which upon administration will generate the compounds of this invention, possess diuretic, natriuretic and chloruretic properties and are therefore useful in the treatment of ailments resulting from an excessive retention of electrolytes especially sodium, chloride or sodium and chloride ions, as in the treatment of edema and other conditions associated with electrolyte and fluid retention.

The α-methyleneacylphenyl derivatives of propionic acid generally are prepared by converting the corresponding saturated acyl compounds which lack the α-methylene group to a salt of a Mannich base by reaction with a salt of a secondary amine as a di-lower-alkylamine, or cyclic amine as piperidine, morpholine and the like in the presence of formaldehyde or paraformaldehyde. Treatment of the Mannich salt with a base such as sodium bicarbonate either with or without heat gives the desired 3-(2-methyleneacylphenyl)propionic acid.

The salts of the Mannich bases prepared by the above procedure are new products and form another feature of this invention.

When the starting material in the above procedure is a saturated acylphenylpropionic acid having two alkyl groups and a hydrogen attached to the carbon adjacent to the carbonyl group of the acyl function, the unsaturated acyl group may be formed by α-brominating (or halogenating) the saturated acyl group and then removing hydrogen bromide (or hydrogen halide), thus introducing a double bond, by treatment with dehydrohalogenating agents such as silver acetate or silver fluoride in benzene or lithium chloride or bromide in dimethylformamide and the like.

The saturated acylphenylpropionic acids employed as starting materials in the foregoing procedures can be prepared by the following methods:

The Friedel-Crafts reaction can be used to prepare the saturated acyl intermediates by reacting together the selected acyl halide and selected phenylpropionic acid or a precursor therof, such as the nitrile, in the presence of aluminum chloride with or without a solvent such as carbon disulfide.

The saturated acylphenylpropionic acids also can be prepared by hydrogenation of the (α-alkylideneacyl)-phenylpropionic acid to produce the desired saturated acylphenylpropionic acid compound.

While the foregoing discussion has been directed to the preparation of α-methyleneacylphenyl derivatives of propionic acids, the same procedures also can be employed for the preparation of the α-methyleneacylphenyl derivatives of butyric acids.

While the above discussion outlines general methods suitable for the preparation of the novel compounds of this invention, it is to be understood that the methods described above as well as those described in the following examples are illustrative of those methods which can be employed and are not to be construed as limiting the invention to the particular methods or the particular compounds specifically described.

EXAMPLE 1

3-(3-CHLORO-4-METHACRYLOYLPHENYL)PROPIONIC ACID

Step A.—*Preparation of 3-(3-chloro-4-propionylphenyl) propionic acid*

To a stirred mixture of 18.5 g. (0.1 mole) of 3-(3-chlorophenyl)propionic acid, 40 g. (0.3 mole) of chloride, and 140 ml. of carbon disulfide is added 11.1 g. (0.12 mole) of propionyl chloride dropwise during 20 minutes. The mixture is refluxed 3.5 hours, the carbon disulfide decanted, and the residue poured into ice water. The product that separates is taken up in ether, extracted into 5% sodium bicarbonate solution which then is acidified to precipitate the product. Recrystallization from cyclohexane-benzene gives 3.5 g. of 3-(3-chloro-4-propionylphenyl) propionic acid, M.P. 67–70° C.

A small sample recrystallized for analysis melts at 67.5–69.5° C.

*Analysis.*—Calculated for $C_{12}H_{13}ClO_3$: Found: C, 59.88, 60.05; H, 5.44, 5.56.

Step B.—*Preparation of 3-{3-chloro-4-[2-(1-piperidylmethyl)propionyl]phenyl}propionic acid hydrochloride*

A mixture of 8.5 g. (0.035 mole) of 3-(3-chloro-4-propionylphenyl)propionic acid, 1.5 g. (0.05 mole) of paraformaldehyde, 4.9 g. (0.04 mole) of piperidine hydrochloride and 1 ml. of ethanolic hydrogen chloride is heated 1.5 hours on the steam bath. The resulting syrup is dissolved in 70 ml. of hot isopropyl alcohol. Chilling the solution precipitates 6.3 g. of the crystalline 3-{3-chloro-4-[2-(1-piperidylmethyl)propionyl]phenyl}propionic acid hydrochloride, M.P. 143–146° C. used in the next step without further purification.

Step C.—*Preparation of 3-(3-chloro-4-methacryloylphenyl)propionic acid*

A solution of 6.4 g. (0.017 mole) of 3-{3-chloro-4-[2-(1-piperidylmethyl)propionyl]phenyl}propionic acid hydrochloride in 80 ml. of saturated sodium bicarbonate solution is allowed to stand 1 hour at room temperature. The solution is acidified to precipitate the solid product which is recrystallized repeatedly from cyclohexane-benzene to yield 1.3 g. of 3-(3-chloro-4-methacryloylphenyl)propionic acid, M.P. 78.5–80.0° C.

*Analysis.*—Calculated for $C_{13}H_{13}ClO_3$: Found: C, 61.79, 62.09; H, 5.18, 5.00; Cl, 14.03, 13.84.

EXAMPLE 2

3-[4-(2-METHYLENEBUTYRYL)PHENYL]PROPIONIC ACID

Step A.—*Preparation of 3-(4-butyrylphenyl) propionic acid*

By substituting in Example 1, Step A, an equimolar amount of 3-phenylpropionic acid for the 3-(3-chlorophenyl)propionic acid there used and an equimolar amount of butyryl chloride for the propionyl chloride there used, and following substantially the same procedure described in Example 1, Step A, there is obtained a 46% yield of 3-(4-butyrylphenyl)propionic acid, M.P. 104–105° C.

*Analysis.*—Calculated for $C_{13}H_{16}O_3$: Found: C, 70.87, 71.17; H, 7.32, 7.40.

Step B.—*Preparation of 3-[4-(2-methylenebutyryl) phenyl]propionic acid*

3-(4-butyrylphenyl)propionic acid (1.94 g., 0.01 mole), paraformaldehyde (0.5 g., 0.0166 mole), dimethyl amine hydrochloride (1.2 g., 0.015 mole) and acetic acid (5 drops) are mixed and heated at 90–100° C., while applying intermittent suction for 1 minute periods, for 2.5 hours. The reaction mixture then is dissolved in water, the solution made basic by addition of 10% sodium bicarbonate solution and heated at 80–90° C. for 45 minutes. Upon acidification, a solid is obtained which after crystallization from cyclohexane gives 1 g. (43%) of 3-[4-(2-methylenebutyryl)phenyl]propionic acid, M.P. 94–96° C.

*Analysis.*—Calculated for $C_{14}H_{16}O_3$: Found: C, 7.38, 72.50; H, 6.94, 6.74.

EXAMPLE 3

3-[3-CHLORO-4-(2-METHYLENEISOVALERYL)PHENYL] PROPIONIC ACID

Step A.—*Preparation of 3-(3-chloro-4-isovalerylphenyl) propionic acid*

By replacing the propionyl chloride employed in Example 1, Step A, by an equimolecular quantity of isovaleryl chloride, and following substantially the same procedure described in Step A of Example 1, there is obtained 3 - (3-chloro-4-isovalerylphenyl)propionic acid.

Step B.—*Preparation of 3-[3-chloro-4-(2-methyleneisovaleryl)phenyl]propionic acid*

By replacing the 3-(3-chloro-4-propionylphenyl)propionic acid employed in Example 1, Step B, by an equimolecular quantity of 3-(3-chloro-4-isovalerylphenyl)propionic acid and following substantially the same procedure described in Step B of Example 1, there is obtained 3 - {3 - chloro-4-[2-(1-piperidylmethyl)isovaleryl]phenyl}propionic acid hydrochloride which when treated with sodium bicarbonate by substantially the same method described in Step C of Example 1 yields 3-[3-chloro-4-(2-methyleneisovaleryl)phenyl]propionic acid.

EXAMPLE 4

3-[3-BROMO-4-(2-METHYLENEBUTYRYL)PHENYL] PROPIONIC ACID

Step A.—*Preparation of 3-(3-bromo-4-butyrylphenyl)- propionic acid*

By replacing the 3-(3-chlorophenyl)propionic acid and the propionyl chloride employed in Example 1, Step A, by equimolecular quantities of 3-(3-bromophenyl)propionic acid and butyryl chloride respectively, and following substantially the same procedure described in Example 1, Step A, there is obtained 3-(3-bromo-4-butyrylphenyl) propionic acid.

Step B.—*Preparation of 3-[3-bromo-4-(2-methylenebutyryl)phenyl]propionic acid*

By replacing the 3-(3-chloro-4-propionylphenyl)propionic acid employed in Example 1, Step B, by an equimolecular quantity of 3-(3-bromo-4-butyrylphenyl)propionic acid and following substantially the same procedure described in Step B of Example 1, there is obtained 3 - {3 - bromo-4-[2-(1-piperidylmethyl)butyryl]phenyl}propionic acid hydrochloride which when treated with sodium bicarbonate by substantially the same method described in Step C of Example 1 yields 3-[3-bromo-4-(2-methylenebutyryl)phenyl]propionic acid.

EXAMPLE 5

3-[3-CHLORO-4-(2-METHYLENEHEPTANOYL)PHENYL] PROPIONIC ACID

Step A.—*Preparation of 3-(3-chloro-4-heptanoylphenyl) propionic acid*

By replacing the propionyl chloride employed in Example 1, Step A, by an equimolecular quantity of heptanoyl chloride, and following substantially the same procedure described in Example 1, Step A, there is obtained 3-(3-chloro-4-heptanoylphenyl)propionic acid.

Step B.—*Preparation of 3-[3-chloro-4-(2-methyleneheptanoyl)phenyl]propionic acid*

By replacing the 3-(3-chloro-4-propionylphenyl)propionic acid employed in Example 1, Step B, by an equimolecular quantity of 3-(3-chloro-4-heptanoylphenyl) propionic acid and following substantially the same procedure described in Step B of Example 1, there is obtained 3 - {3-chloro-4-[2-(1-piperidyl)methylheptanoyl]

phenyl∫propionic acid hydrochloride which when treated with sodium bicarbonate by substantially the same method described in Step C of Example 1 yields 3-[3-chloro-4-(2-methyleneheptanoyl)phenyl]propionic acid.

EXAMPLE 6

3-[3-METHYL-4-(2-METHYLENEBUTYRYL)PHENYL] PROPIONIC ACID

Step A.—*Preparation of 3-(3-methyl-4-butyrylphenyl) propionic acid*

By replacing the 3-(3-chlorophenyl)propionic acid and the propionyl chloride employed in Example 1, Step A, by equimolecular quantities of 3-(3-methylphenyl)propionic acid and butyryl chloride respectively, and following substantially the same procedure described in Example 1, Step A, there is obtained 3-(3-methyl-4-butyrylphenyl) propionic acid.

Step B.—*Preparation of 3-[3-methyl-4-(2-methylenebutyryl)phenyl]propionic acid*

By replacing the 3-(3-chloro-4-propionylphenyl)propionic acid employed in Example 1, Step B, by an equimolecular quantity of 3-(3-methyl-4-butyrylphenyl)propionic acid and following substantially the same procedure described in Step B of Example 1, there is obtained 3 - ∫3 - methyl-4-[2-(1-piperidylmethyl)butyryl]phenyl ∫propionic acid hydrochloride which when treated with sodium bicarbonate by substantially the same method described in Step C of Example 1 yields 3-[3-methyl-4-(2-methylenebutyryl)phenyl]propionic acid.

EXAMPLE 7

3-[3-METHYL-4-(2-METHYLENE-3-CARBOXYPROPIONYL) PHENYL]PROPIONIC ACID

Step A.—*Preparation of 3-[3-methyl-4-(3-carboxypropionyl)phenyl]propionic acid*

To a solution of 3-methylphenylpropionic acid (0.1 mole) and of succinic anhydride (0.1 mole) in 100 ml. of carbon bisulfide and 50 ml. of nitrobenzene maintained at 30° C., aluminum chloride (0.44 mole) is added portionwise over a 30-minute period. The reaction mixture is allowed to stand at room temperature for 2–3 days. The solvent is decanted and the residual product added to a mixture of ice and hydrochloric acid to give 3-[3-methyl-4-(3-carboxypropionyl)phenyl]propionic acid.

Step B.—*Preparation of 3-[3-methyl-4-(2-methylene-3-carboxypropionyl)phenyl]propionic acid*

The 3-[3-methyl-4-(3-carboxypropionyl)phenyl]propionic acid (obtained by the above procedure) is converted to the hydrochloride salt of its Mannich base by substantially the same procedure described in Example 1, Step B. The Mannich compound then is treated with aqueous sodium bicarbonate by essentially the same method outlined in Example 1, Step C, to give 3-[3-methyl-4-(2-methylene-3-carboxypropionyl)phenyl]propionic acid.

EXAMPLE 8

3-[3-METHYL-4-(2-METHYLENE-3-TRIFLUOROMETHYLBUTYRYL)PHENYL]PROPIONIC ACID

Step. A.—*Preparation of 3-[3-methyl-4-(3-trifluoromethylbutyryl)phenyl]propionic acid*

By replacing the 3-(3-chlorophenyl)-propionic acid and the propionyl chloride employed in Example 1, Step A, by equimolecular quantities of 3-(3-methylphenyl)propionic acid and 3-trifluoromethylbutyryl chloride respectively, and following substantially the same procedure described in Example 1, Step A, there is obtained 3-[3-methyl - 4 - (3 - trifluoromethylbutyryl)phenyl]propionic acid.

Step B.—*Preparation of 3-[3-methyl-4-(2-methylene-3-trifluoromethylbutyryl)phenyl]propionic acid*

By replacing the 3-(3-chloro-4-propionyl-phenyl)propionic acid employed in Example 1, Step B, by an equimolecular quantity of 3-[3-methyl-4-(3-trifluoromethylbutyryl)phenyl]propionic acid and following substantially the same procedure described in Step B of Example 1, there is obtained 3-∫3-methyl-4-[2-(1-piperidylmethyl)-3-trifluoromethylbutyryl]phenyl∫propionic acid hydrochloride which when treated with sodium bicarbonate by substantially the same method described in Step C of Example 1 yields 3-[3-methyl-4-(2-methylene-3-trifluoromethylbutyryl)phenyl]propionic acid.

EXAMPLE 9

3-[3-METHYL-4-(2-METHYLENE-4-PHENYLMERCAPTOBUTYRYL)PHENYL]PROPIONIC ACID

Step A.—*Preparation of 3-[3-methyl-4-(4-chlorobutyryl)phenyl]propionic acid*

By replacing the 3-(3-chlorophenyl)-propionic acid and the propionyl chloride employed in Example 1, Step A, by equimolecular quantities of 3-(3-methylphenyl)propionic acid and 4-chlorobutyryl chloride respectively, and following substantially the same procedure described in Example 1. Step A., there is obtained 3-[3-methyl-4-(4-chlorobutyryl)phenyl]propionic acid.

Step B.—*Preparation of 3-[3-methyl-4-(4-phenylmercaptobutyryl)phenyl]propionic acid*

A mixture of 2.2 ml. of thiophenol in 50 ml. of ethanol containing 1.12 g. of potassium hydroxide and 2.6 g. of 3-[3-methyl-4-(4-chlorobutyryl)phenyl]propionic acid is heated on the steam bath for about 30 minutes, cooled and poured into 60 ml. of water. Upon addition of hydrochloric acid, 3-[3-methyl-4 - (4 - phenylmercaptobutyryl) phenyl]propionic acid separates and is collected.

Step C.—*Preparation of 3-[3-methyl-4-(2-methylene-4-phenylmercaptobutyryl)phenyl]propionic acid*

By replacing the 3-(3-chloro-4-propionylphenyl)propionic acid employed in Example 1, Step B, by an equimolecular quantity of 3-[3-methyl-4-(4-phenylmercaptobutyryl)phenyl]propionic acid and following substantially the same procedure described in Step B of Example 1, there is obtained 3-∫3-methyl-4-[2-(1-piperidylmethyl)-4-phenylmercaptobutyryl]phenyl∫propionic acid hydrochloride which when treated with sodium bicarbonate by substantially the same method described in Step C of Example 1 yields 3-[3-methyl-4-(2-methylene-4-phenylmercaptobutyryl)phenyl]propionic acid.

EXAMPLE 10

ETHYL 3-∫3-METHYL-4-[2-METHYLENE-4-(MORPHOLINYL) BUTYRYL]PHENYL∫PROPIONATE

Step A.—*Preparation of ethyl 3-∫3-methyl-4-[4-(4-morpholinyl)butyryl]phenyl∫propionate*

A mixture of 3-[3-methyl-4-(4-chlorobutyryl)phenyl] propionic acid, from Example 9, Step A, (0.02 mole) and morpholine (0.1 mole) in 30 ml. of benzene and 50 mg. of potassium iodide is heated under reflux for about 24 hours, filtered and concentrated to dryness in vacuo. The residue is heated under reflux for about 2 hours with 50 ml. of 30% alcoholic hydrogen chloride and the solution concentrated to dryness in vacuo. Aqueous sodium bicarbonate is added and the mixture extracted with ether. The ethereal extract is washed with water, dried over sodium sulfate, filtered and evaporated to dryness on a steam bath to give ethyl 3-∫3-methyl-4-[4-morpholinyl) butyryl]phenyl∫propionate.

Step. B.—*Preparation of ethyl 3-∫3-methyl-4-[2-methylene-4-(4-morpholinyl)butyryl]phenyl∫propionate*

By replacing the 3-(3-chloro-4-propionyhplenyl)propionic acid employed in Example 1, Step B, by an equimolecular quantity of ethyl 3 - {3 - methyl - 4{4 - (4-morpholinyl)butyryl]phenyl}propionate and following substantially the same procedure described in Step B of Example 1, there is obtained ethyl 3-{3-methyl-4-[2-(1-piperidylmethyl) - 4 - (4 - morpholinyl)butyryl]phenyl}propionate hydrochloride which when treated with sodium bicarbonate by substantially the same method described in Step C of Example 1 yields ethyl 3 - {3 - methyl - 4 - [2-methylene-4-(4-morpholinyl), butyryl]phenyl}propionate.

EXAMPLE 11

3-[3-CHLORO-4-(2-CYCLOHEXYLACRYLOYL)PHENYL] PROPIONIC ACID

Step A.—*Preparation of 3-(3-chloro-4-cyclohexylacetylphenyl)propionic acid*

By replacing the propionyl chloride employed in Example 1, Step A, by an equimolecular quantity of cyclohexylacetyl chloride, and following substantially the same procedure described in Example 1, Step A, there is obtained 3-(3-chloro - 4 - cyclohexylacetylphenyl)propionic acid.

Step B.—*Preparation of 3-[3-chloro-4-(2-cyclohexylacryloyl)phenyl]propionic acid*

By replacing the 3-(3-chloro-4-propionylphenyl)propionic acid employed in Example 1, Step B, by an equimolecular quantity of 3-(3-chloro - 4 - cyclohexylacetylphenyl)propionic acid and following substantially the same procedure described in Step B of Example 1, there is obtained 3-{3-chloro-4-[2-(1-piperidylmethyl) - 2 - cyclohexylacetyl]phenyl}propionic acid hydrochloride which when treated with sodium bicarbonate by substantially the same method described in Step C of Example 1 yields 3-[3-chloro-4 - (2 - cyclohexylacryloyl)phenyl]propionic acid.

EXAMPLE 12

3-[3-CHLORO-4-(2-CYCLOPENTYLACRYLOYL)PHENYL] PROPIONIC ACID

By replacing the cyclohexylacetyl chloride employed in Step A of Example 11 by an equimolecular quantity of cyclopentylacetyl chloride and following substantially the same procedures called for in Example 11, Steps A and B, there is obtained 3-[3-chloro-4 - (2 - cyclopentylacryloyl)phenyl]propionic acid.

EXAMPLE 13

3-{3-CHLORO-4-[2-P-TOLYL)ACRYLOYL]PHENYL} PROPIONIC ACID

By replacing the cyclohexylacetyl chloride employed in Step A of Examle 11 by an equimolecular quantity of p-tolyacetyl chloride and following substantially the same procedures called for in Example 11, Steps A and B, there is obtained 3 - {3-chloro-4-[2-(p-tolyl)acryloyl]phenyl}propionic acid.

EXAMPLE 14

3-[3-CHLORO-4-(2-PHENYLACRYLOYL)PHENYL] PROPIONIC ACID

By replacing the cyclohexylacetyl chloride employed in Step A of Example 11 by an equimolecular quantity of phenylacetyl chloride and following substantially the same procedures called for in Example 11, Steps A and B, there is obtained 3 - [3-chloro-4-(2-phenylacryloyl)phenyl]propionic acid.

EXAMPLE 15

3-[3-METHOXY-4-(2-METHYLENEBUTYRYL)PHENYL] PROPIONIC ACID

Step A.—*Preparation of 3-(3-methoxy-4-butyrylphenyl) propionic acid*

By replacing the 3-(3-chlorophenyl)propionic acid and the propionyl chloride employed in Example 1, Step A, by equimolecular quantities of 3 - (3-methoxyphenyl)propionic acid and butyryl chloride respectively, and following substantially the same procedure described in Example 1, Step A, there is obtained 3-(3-methoxy-4-butyrylphenyl)propionic acid.

Step B.—*Preparation of 3-[3-methoxy-4-(2-methylenebutyryl)phenyl]propionic acid*

By replacing the 3-(3-chloro-4-propionylphenyl)propionic acid employed in Example 1, Step B, by an equimolecular quantity of 3 - (3-methoxy-4-butyrylphenyl)propionic acid and following substantially the same procedure described in Step B of Example 1, there is obtained 3 - {3 - methoxy - 4 - [2-(1-piperidylmethyl)butyryl] phenyl}propionic acid hydrochliride which when treated with sodium bicarbonate by substantially the same method described in Step C of Example 1 yields 3-[3-methoxy-4-(2-methylenebutyryl)phenyl]propionic acid.

EXAMPLE 16

3-[3-BROMO-4-(2-ETHYLIDENEPROPIONYL)PHENYL] PROPIONIC ACID

Step A.—*Preparation of 3-[3-bromo-4-(2-methylbutyryl)phenyl]propionic acid*

3 - [3 - bromo - 4 - (2 - methylenebutyryl)phenyl] propionic acid, prepared as described in Example 4, is dissolved in isopropyl alcohol and 5% palladium on charcoal is added. The mixture is hydrogenated at an initial pressure of 35 pounds per square inch on a Parr apparatus, and after the required amount of hydrogen is absorbed, the solution is warmed and filtered to remove the catalyst to give 3 - [3-bromo-4-(2-methylbutyryl)phenyl] propionic acid.

Step B.—*Preparation of 3-[3-bromo-4-(2-bromo-2-methylbutyryl)phenyl]propionic acid*

The keto acid prepared as described in Step A, above, is dissolved in acetic acid and an equivalent amount of bromine in acetic acid is added dropwise with stirring over a 10–15 minute period. The reaction is initiated by adding two drops of 48% hydrobromic acid. The mixture is added to water containing a little sodium bisulfite and the solid that separates is collected, washed with water and dried to give 3 - [3-bromo-4-(2-bromo-2-methylbutyryl) phenyl]propionic acid.

Step C.—*Preparation of 3-[3-bromo-4-(2-ethylidenepropionyl)phenyl]propionic acid*

The bromo compound prepared as described in Step B, lithium bromide and dimethylformamide are mixed and heated at 80°–90° C. for about 4 hours. The mixture then is poured into water and the solid that separates is removed by filtration and dried to give 3-[3-bromo-4-(2-ethylidenepropionyl)phenyl]propionic acid.

While Examples 1 through 16 have described the preparation of (α-alkylideneacyl)phenylpropionic acid compounds, the homologous butyric acid compounds can be made following substantially the same procedure with the exception that the particular phenylpropionic acid reactant in each example is replaced by the corresponding phenylbutyric acid. As the butyric acid homologs are the equivalents of the propionic acid compounds, only one example is included herein to illustrate their preparation.

EXAMPLE 17

4-[4-(2-METHYLENEBUTYRYL)PHENYL]BUTYRIC ACID

By substituting in Example 1 equimolecular quantities of 4-phenylbutyric acid and of butyryl chloride for the 3-(3-chlorophenyl)propionic acid and propionyl chloride there used, and otherwise following substantially the same procedure described in Example 1, Step A, there is obtained 4-(4-butyrylphenyl)butyric acid. This product is converted to 4-[4-(2-dimethylaminomethylbutyryl)phenyl] butyric acid hydrochloride by reaction and paraformaldehyde, dimethylamine hydrochloride and acetic acid by substantially the same method described in Step B of Example 2. Subsequent treatment with 10% sodium bicarbonate by the method described in Step B of Example 2 converts this salt of a Mannich base to 4-[4-(2-methylenebutyryl)phenyl]butyric acid.

The novel compounds of this invention are effective diuretic and/or saluretic agents. Because of this property they are useful in therapy for the treatment of conditions resulting from an excessively high concentration of electrolyte in the body or an excessively high retention of fluid in the body such as in the treatment of edematous conditions.

The compounds of this invention can be incorporated in capsules or other usual dosage forms prepared by well known methods which can be made available for the physician's symptomatic adjustment of the dosage to the individual patient.

Fhile the above examples describe the preparation of certain compounds which are illustrative of the novel compounds of this invention, it is to be understood that the invention is not to be limited to the specific compounds described in the examples or by the specific reaction conditions described for the preparation of these compounds but is to be understood to embrace variations and modifications thereof which fall within the scope of the appended claims.

What is claimed is:

1. A compound having the formula:

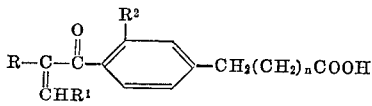

wherein R is lower alkyl, carboxy substituted lower alkyl, trifluoromethyl substituted lower alkyl, phenylmercapto substituted lower alkyl, 4-morpholinyl substituted lower alkyl, cyclohexyl, cyclopentyl, p-tolyl or phenyl; $R^1$ is hydrogen or lower alkyl; $R^2$ is hydrogen, halogen, lower alkyl or lower alkoxy and $n$ is an integer having a value of 1-2; and the nontoxic, pharmaceutically acceptable salt and lower alkyl esters thereof.

2. A compound having the formula:

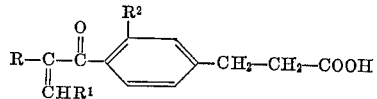

wherein R is lower alkyl, carboxy substituted lower alkyl, trifluoromethyl substituted lower alkyl, phenylmercapto substituted lower alkyl, 4-morpholinyl substituted lower alkyl, cyclohexyl, cyclopentyl, p-tolyl or phenyl; $R^1$ is hydrogen or lower alkyl; and $R^2$ is hydrogen, halogen, lower alkyl or lower alkoxy.

3. 3-[3-chloro-4-(2-methylene-lower-alkanoyl)-phenyl]propionic acid.

4. 3 - [3-bromo-4-(2-methylene-lower-alkanoyl)-phenyl]propionic acid.

5. 3-[3-methyl-4-(2-methylene-lower-alkanoyl) - phenyl]propionic acid.

6. 3-[3-chloro-4-methacryloylphenyl]-propionic acid.

7. 3-[4-(2-methylenebutyryl)phenyl]-propionic acid.

References Cited

UNITED STATES PATENTS 3,042,714   7/1962   Schultz et al. _____ 260—515

FOREIGN PATENTS 165,498   10/1955   Australia.
590,523   1/1960   Canada.

OTHER REFERENCES

Adams et al.: "Organic Reactions," volume I, John Wiley and Sons, Inc., N.Y., 1942, pp. 340–319.

Finar: "Organic Chemistry," volume I, Longmans, Green and Co. Ltd., London, 1963, p. 282.

Migrdichian: "Organic Synthesis," volume I, Reinhold Publishing Corp., N.Y., 1957, pp. 4–7 and 533–534.

Skinner et al.: Journal of Organic Chemistry, volume 25, 1960, pp. 953–6.

LORRAINE A. WEINBERGER, *Primary Examiner.*

D. D. HORWITZ, *Examiner.*

R. E. MASSA, T. L. GALLOWAY, *Primary Examiners.*